United States Patent [19]
Zampini et al.

[11] Patent Number: 5,691,966
[45] Date of Patent: *Nov. 25, 1997

[54] RECORDING EIGHT DIGITAL AUDIO CHANNELS ON A SINGLE MAGNETO OPTICAL DISK

[75] Inventors: Michael A. Zampini, Boca Raton; Sean Stevens, Pompano Beach; David C. Schmidt, Jupiter, all of Fla.

[73] Assignees: Sony Corporation, Japan; Sony Electronics Inc., N.J.

[*] Notice: The term of this patent shall not extend beyond the expiration date of Pat. No. 5,493,547.

[21] Appl. No.: 542,705

[22] Filed: Oct. 13, 1995

Related U.S. Application Data

[63] Continuation of Ser. No. 128,717, Sep. 30, 1993, Pat. No. 5,493,547.

[51] Int. Cl.[6] .................................................. G11B 5/09
[52] U.S. Cl. ................................ 369/49; 369/48; 369/32
[58] Field of Search .............................. 369/14, 47, 48, 369/49, 59, 32, 60; 360/19.1, 32, 39, 46, 49, 51; 395/375, 250, 275, 800

[56] References Cited

U.S. PATENT DOCUMENTS

| 5,303,218 | 4/1994 | Miyake | 369/48 |
| 5,493,547 | 2/1996 | Zampini et al. | 369/48 |

*Primary Examiner*—Ali Neyzari
*Attorney, Agent, or Firm*—Ronald P. Kananen

[57] ABSTRACT

A method and apparatus for recording onto or playing back from a magneto optical disk eight channels of digital audio data. Eight channels of serial audio data, for example in a AES/EBU format is converted to parallel data and provided to one or more buffers via a DMA controller. After buffering, the data may be recorded onto a MO disk via an SCSI.

19 Claims, 10 Drawing Sheets

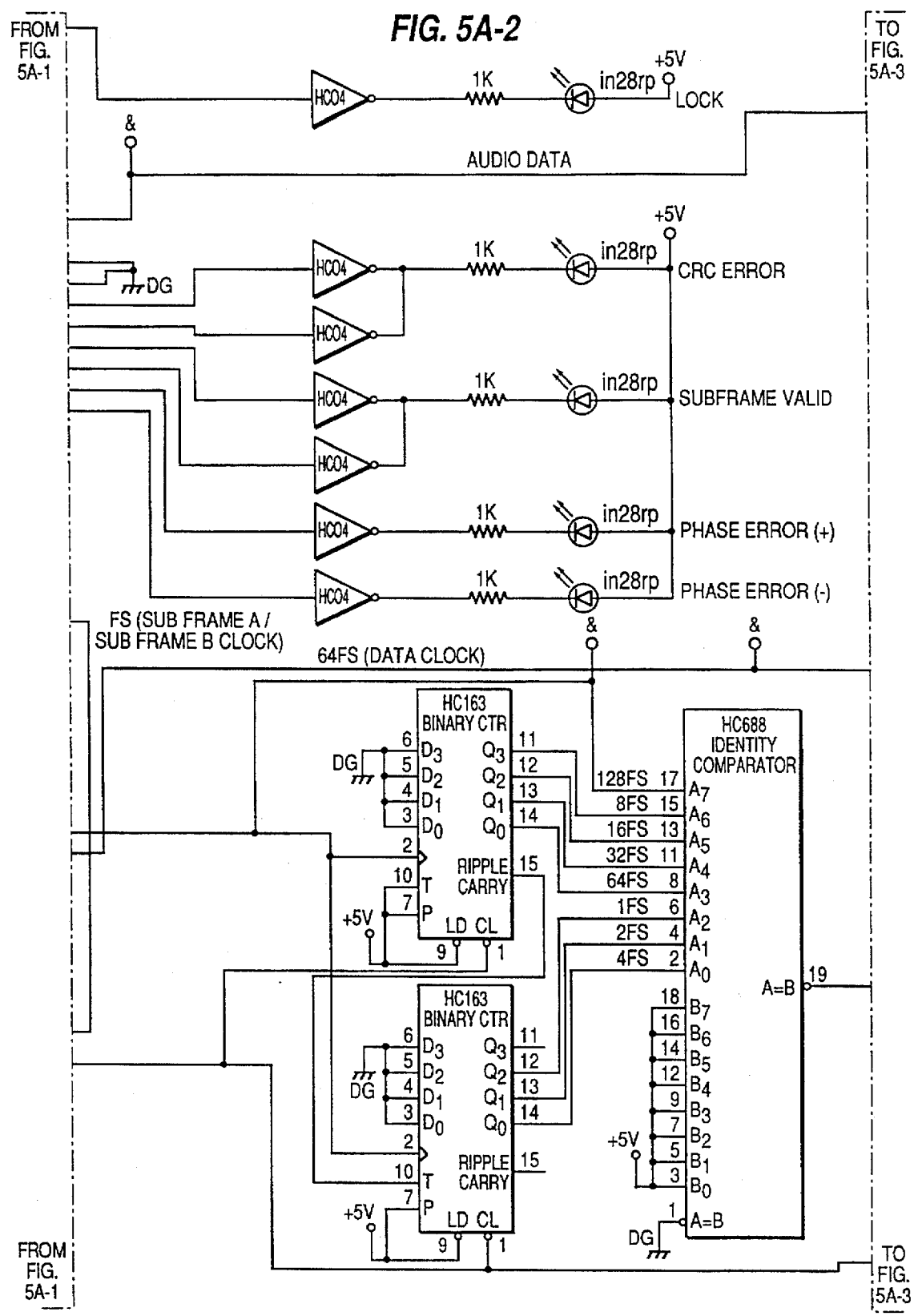

RECORDING EIGHT DIGITAL AUDIO CHANNELS ON A SINGLE MAGNETO OPTICAL DISK

This application is a continuation of application Ser. No. 08/128,717 filed Sep. 30, 1993 now U.S. Pat. No. 5,493,547.

FIELD OF THE INVENTION

This invention relates to the recording of digital audio data on a magneto optical disk (MO). More specifically, this invention relates to an improved method and apparatus for recording eight channels of digital audio data on a single MO disk.

BACKGROUND OF THE INVENTION

In the field of data recording, various recording devices are used which incorporate different technologies. In the audio recording field, digital audio tape (DAT) recording technology is widely used. When this technology is employed, generally four channels of information are simultaneously recorded on the tape medium.

While providing an improvement in recording quality over previous technology, DAT still suffers from some drawbacks. First, there is a slow access time in playing back recorded data. A second related drawback is the difficulty in skipping tracks for editing or playback. Moreover, the use of only four channels limits sound quality.

Outside the audio recording field, magneto optical (MO) disks have been developed for the storage and playback of digital data. Magneto optical disks provide at least two advantages over storage systems using a tape storage medium. First, the information stored on the MO disk may be accessed much more rapidly than can information stored on a tape recording medium. Secondly, the MO disk provides the capability of "slipping" tracks in time.

However, wider use of MO-recording has heretofore been limited because of the relatively slow transfer rate of data from the MO disk controller to the MO disk itself, and the relatively fast rate of data acquisition from the source to be recorded. The discrepancy in speed of these two functions have made it difficult to apply this technology to other fields, such as audio recording.

Hence, there is a need to provide a recording device which provides the ease of use afforded by magneto optical disk-based recording systems. There is a further need to improve recording quality by simultaneously recording more than four tracks of data on a recording medium.

SUMMARY OF THE INVENTION

A general object of this invention is to overcome these and other drawbacks of the prior art by providing a magneto optical disk recorder which is capable of recording eight tracks of data onto a magneto optical disk. Accordingly, there is disclosed an apparatus for recording and playing back digital audio signals comprising: input means for providing a plurality of channels of digital audio signals; buffer means for storing digital data signals; a direct memory access (DMA) controller for coupling the plurality of channels of digital audio signals to the buffer means; a magneto optical disk drive; and a small computer system interface (SCSI) for operatively coupling the MO disk drive with the DMA controller.

According to one aspect of the invention, the plurality of channels of audio data consists of eight channels of audio data.

According to another aspect of the invention, the input means includes means for converting the plurality of channels of audio data from serial data to parallel data.

According to still another aspect of the invention, serial data is provided to the apparatus in an AES/EBU format.

According to yet another aspect of the invention, the apparatus further includes output means coupled to the MO disk drive through the SCSI and the buffer means, the output means providing a plurality of channels of audio signals corresponding to a plurality of channels of audio data which has been stored on a MO disk.

BRIEF DESCRIPTION OF THE DRAWINGS

FIGS. 5A-1, 5A-2, 5A-3, 5B-1, 5B-2, 5B-3 are circuit diagrams showing the embodiment of FIG. 4 in greater detail.

DETAILED DESCRIPTION OF THE PREFERRED EMBODIMENT

Figure 1:
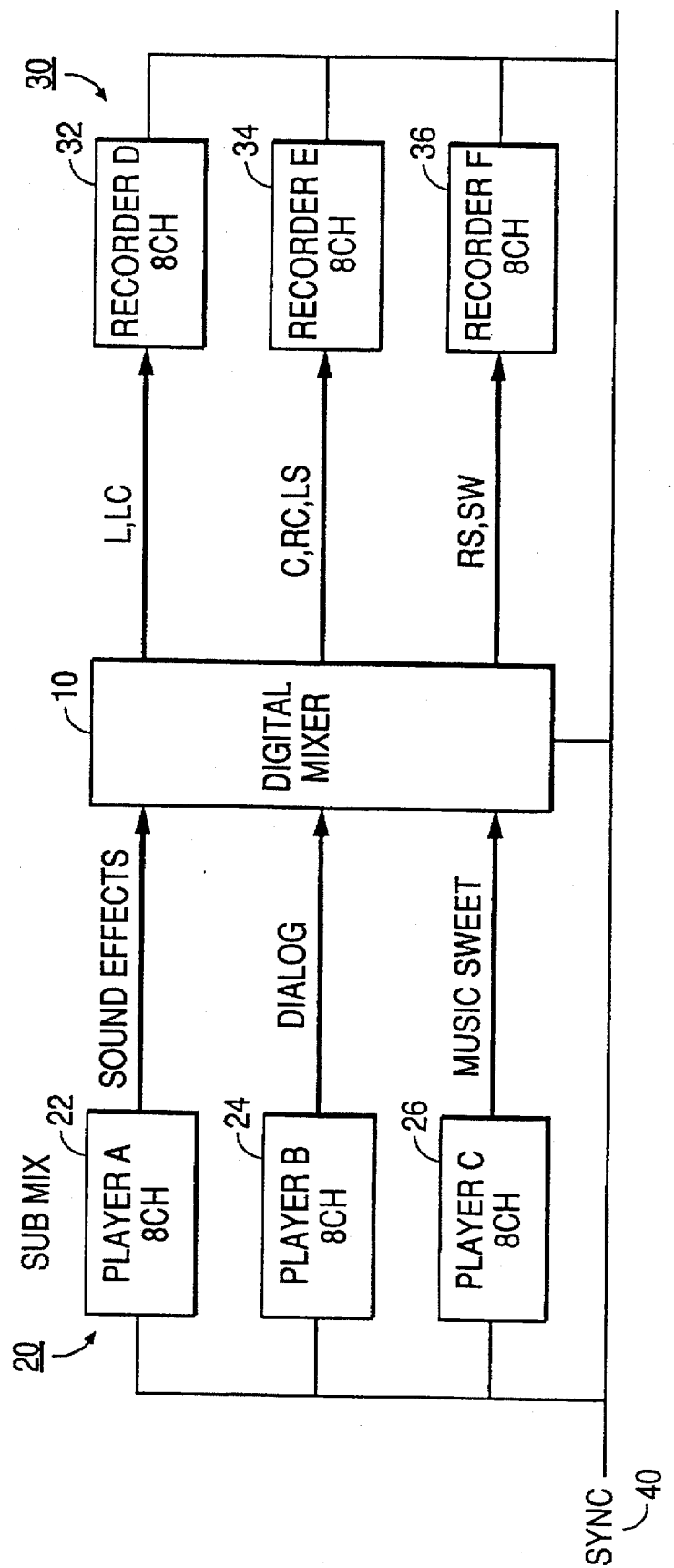
FIG. 1 is an example of an audio recording system utilizing the present invention.

FIG. 1 shows an audio recording system which may be used for professional recording, for example. In this system, a digital mixer 10 is coupled to various multichannel input devices 20 and various multichannel output devices 30. Each device operatively shares a common SYNC signal 40. The input devices shown are a plurality of eight-channel player-recorders 20. A first player 22 is used to provide sound effects to the digital mixer, while other players 24 and 26 provide dialog and music sweet, respectively, to the mixer 10. Once input to the mixer 10, these signals are processed in various ways as known in the art and can be output to, for example, a plurality of multichannel recorders 32, 34, 36. In the system shown, each of the player/recorders is an eight channel device; that is, each device plays-back or records eight channels simultaneously.

Figure 2:
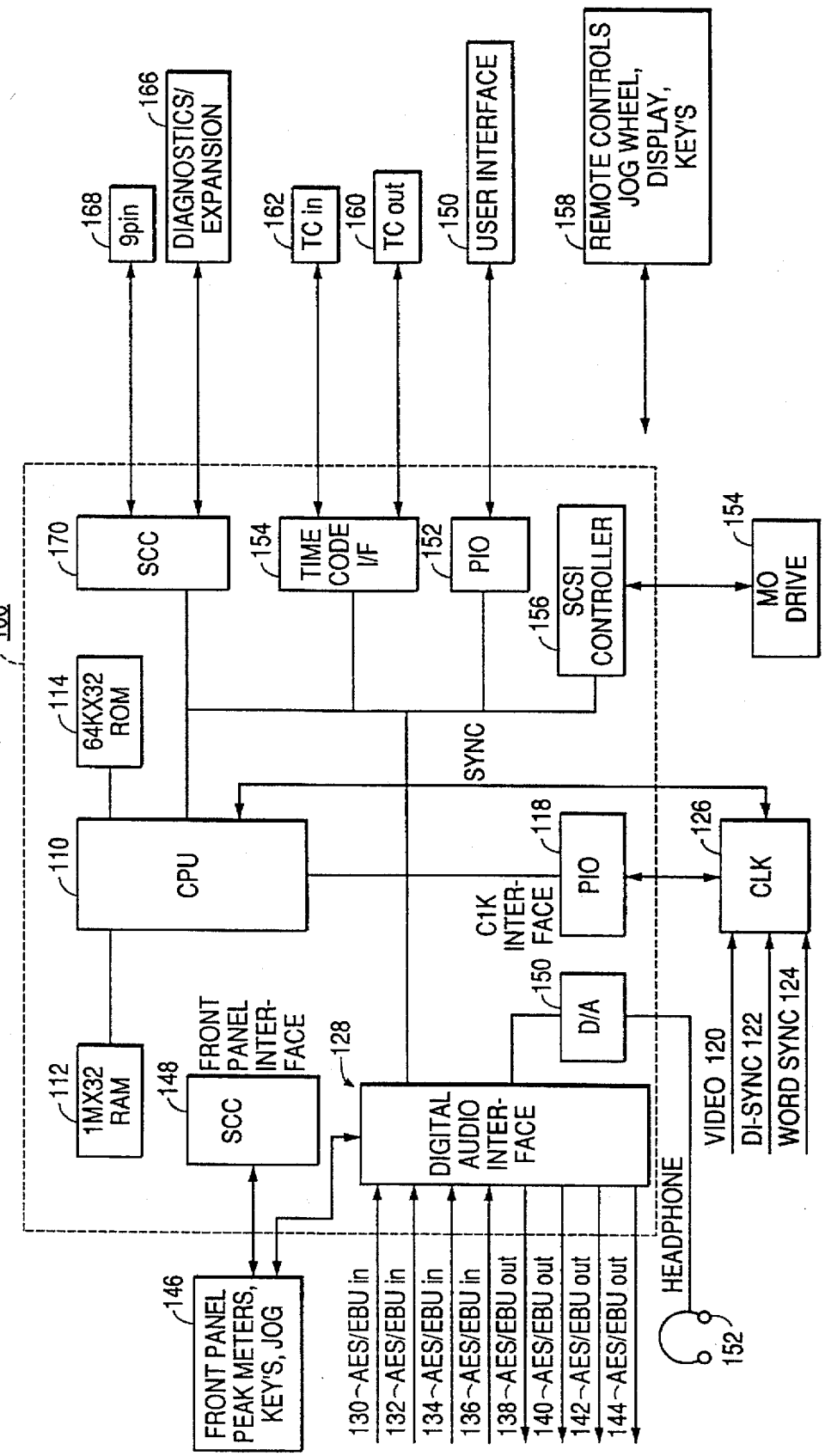
FIG. 2 is a block diagram showing an embodiment of the present invention.

FIG. 2 is a block diagram of an eight channel player/recorder 100 according to one embodiment of the invention, such as may be used in the recording system previously described. In the device shown, various signals, both input and output, are controlled by a central processing unit (CPU) 110 which is associated with both a volatile memory 112 and a non-volatile memory 114. In the example shown, the CPU has associated with it a random access memory (RAM) 112, as well as a read only memory (ROM) 114.

The recorder 100 is synchronized by means of SYNC signals provided to a CIK interface 118, for example a parallel input output (PIO) circuit. The SYNC signals may comprise, for example video 120, di-sync 122 and word sync 124 signals input to the recorder 100 via a clock circuit 126, as shown in FIG. 2. In this way, the recorder 100 may be synchronized with other devices which comprise a recording system, as in the example shown in FIG. 1.

The CPU 110 is used to control the flow of digital audio data input to and output from the recorder 100 via a digital audio interface 128. The digital audio data is input at four ports 130, 132, 134, and 136 to the digital audio interface 128. Each port receives the data in AES/EBU format. Thus, each port provides two channels of serial audio data.

Together, the four ports provide four separate lines for providing eight audio channels to the recorder device. Similarly, by using four audio OUT ports 138, 140, 142, and 144, eight channels of digital audio signals may be output from the recorder 100. Digital audio data may also be converted to analog signals using a D/A converter 150, and the analog signals output to an external monitoring device, such as a set of headphones 152.

The digital audio interface 128 may be controlled locally by a user via a front panel 146 of the recorder 100, which may include various peak meters, keys or jog wheels. These devices may provide a display of the status of the recorder. Moreover, input from these devices may be used to control the recorder via a serial communication controller 148 (SCC). Alternatively, the recorder may include means for remote control and display 158, including, for example a jog wheel, display, or keys. Further, the recorder 100 may be controlled using a user interface 150 linked to the recorder 100 via a parallel input output (PIO) circuit 152.

In a typical operation, eight channels of data are input from the four IN ports. This input provides four sets of data in parallel which may be conveniently processed by the CPU. Each set of data contains two channels of twenty four bit audio data for a total of eight channels. This data may be processed in the recorder 100 under control of the CPU 110.

More specifically, according to one embodiment of the invention, the eight channels of digital audio signals may be recorded onto, or played-back from a magneto optical disk drive 154 via a small computer system interface (SCSI) 156. In this example, the problems associated with a large data transfer rate and a relatively slow read/write rate are overcome by use of proper buffering and direct memory access (DMA) transfers. These features are explained with reference to FIG. 3.

Also shown in FIG. 2 are means for providing time code data to be associated with the digital audio signals processed in the recorder 100. According to the embodiment shown, a time code interface circuit 164 may be used to receive input time code data 162 or transmit output time code data 160. Both the input 162 and output time code data 160 are coupled with the CPU 110 through the time code interface circuit 164.

Further, the recorder 100 may be coupled to other external devices through a serial communications controller (SCC) 170. The SCC 170 permits the use of external devices 166 for expansion or diagnostics of the recorder. Other external devices may be coupled through a 9 pin connector 168, as shown.

Figure 3:
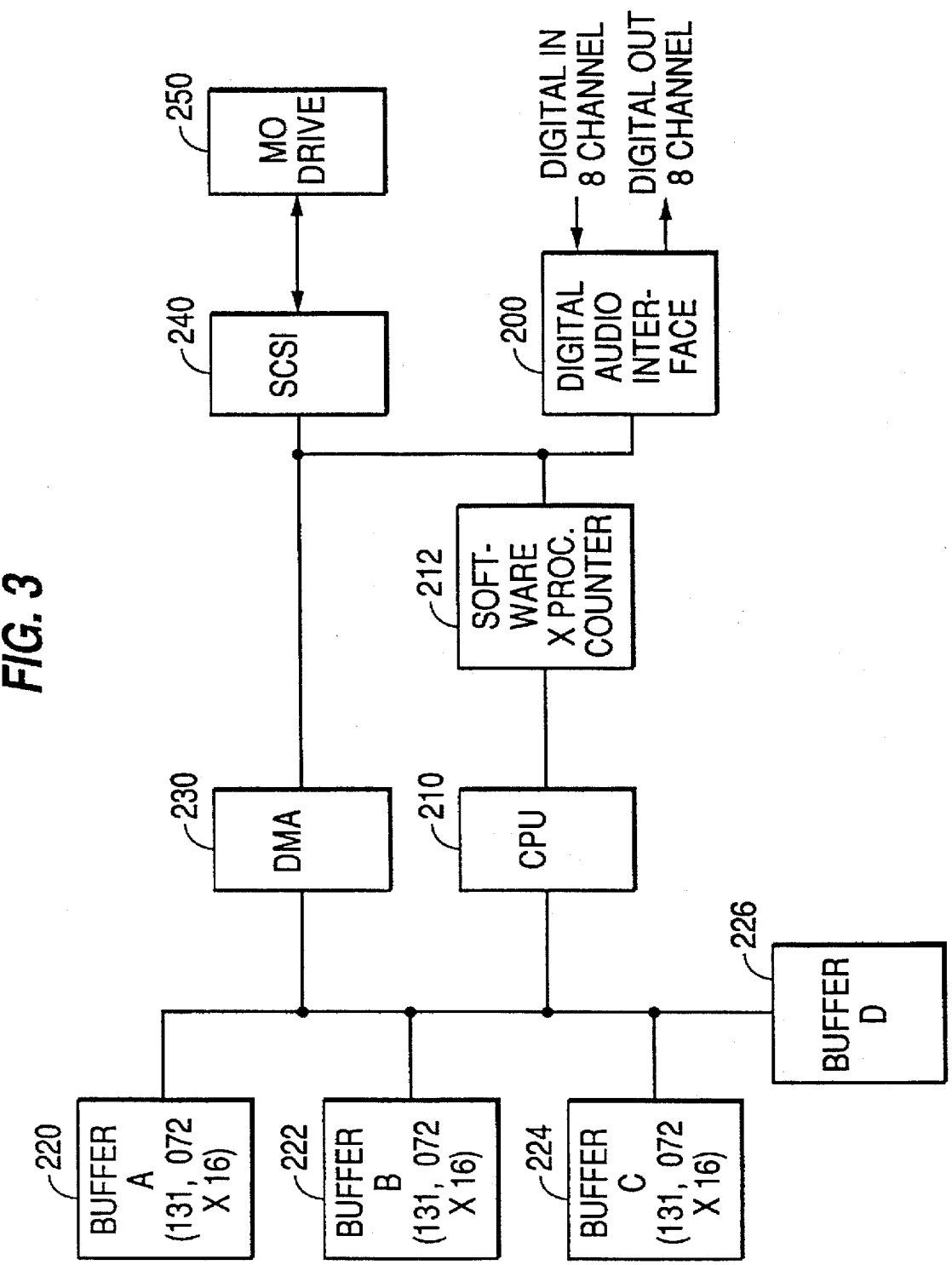
FIG. 3 is a block diagram showing another embodiment of the present invention.

FIG. 3 shows a block diagram illustrating a preferred embodiment of the invention. In a recording operation using the embodiment shown, eight channels of digital audio signals are input to a digital audio interface 200. The digital audio interface 200 converts the serial data to parallel data which can be processed more conveniently by a CPU 210. Such processing may be performed, for example, under control of crossfade control software 212. The conversion of the data may includes error checking processing by means known in the art (not shown).

In order to overcome the difference in the transfer rate of the data and the slower read/write rate, various buffers 220, 222, 224, and 226 are provided. Accordingly, the parallel data is read into the buffers 220, 222, 224, and 226 via a DMA controller 230. After being received into a buffer, the data can be provided to the SCSI 240 at the correct speed, as required by the particular MO drive 250 which is used. For example, a typical SCSI controller and MO drive may write 1.5 mbytes every second, while each read/write interval in which an eight channels (eight words) are read or written requires 20.83 μsec. Thus, if two buffers holding 131,072 words (16 bytes) are used, the SCSI would require 174 msec to write the contents of two buffers holding eight audio channels. However, different buffer sizes may be used as required as different MO drives with various speeds are used.

The system shown in FIG. 3 may also be used in a similar manner for a playback operation. That is, as the MO drive 250 reads digital audio data from a MO disk, the data is provided to buffers 220, 222, 224, and 226 from which it can be transferred via the DMA controller 230 to the digital audio interface 200. The digital audio interface 200 converts the parallel data to serial data which may be output to other devices (not shown).

Figure 4:
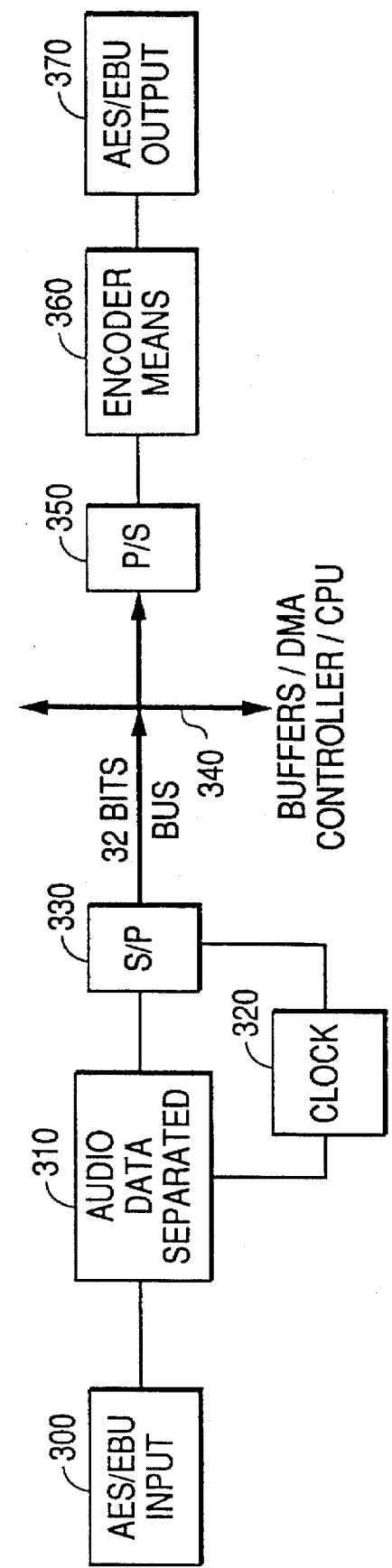
FIG. 4 is a block diagram showing yet another embodiment of the present invention.

FIG. 4 is a block diagram illustrating an embodiment by which eight channel serial audio data may be input into a recorder and converted to parallel data for processing or recording. Similarly, the embodiment discloses an example by which processed data or data read from a MO disk may be converted to serial data to be output to other devices. In this example, serial data is input using the AES/EBU format 300. In the next stage 310 of the circuit, the audio data bits of this thirty-two bit format are separated from the other bits, such as sync bits and the audio sample validity bit, as known in the art. According to this embodiment, the data bits representing the audio signal may comprise twenty-four bits of audio data, which are converted from a serial format to a parallel format by a serial to parallel converter circuit 330.

The control circuits for implementing the data separation 310 and S/P conversion 330 are operated according to control signals originating from a common clock circuit 320. The parallel data is then input along with associated address bits onto bus lines 340 which are operatively coupled to a DMA controller and buffer circuits as well as to a CPU.

Parallel audio data, for example from various buffers, may be sent to a parallel to serial conversion circuit 350 and then encoded into AES/EBU format by encoding circuits 360. The encoded data may then be provided to other output devices via a serial output 370.

Figures 1, 5A:
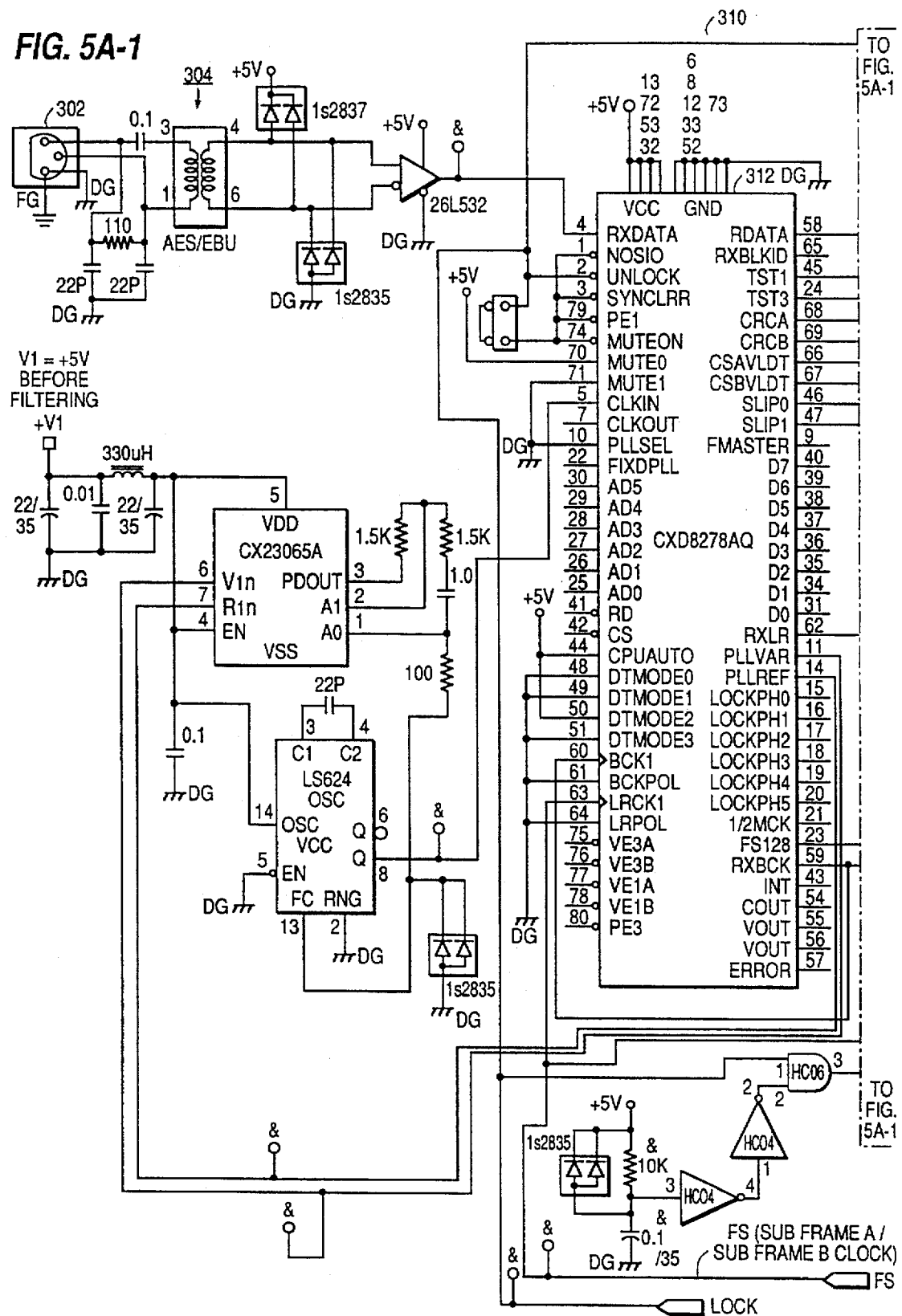
Figures 3, 5A:
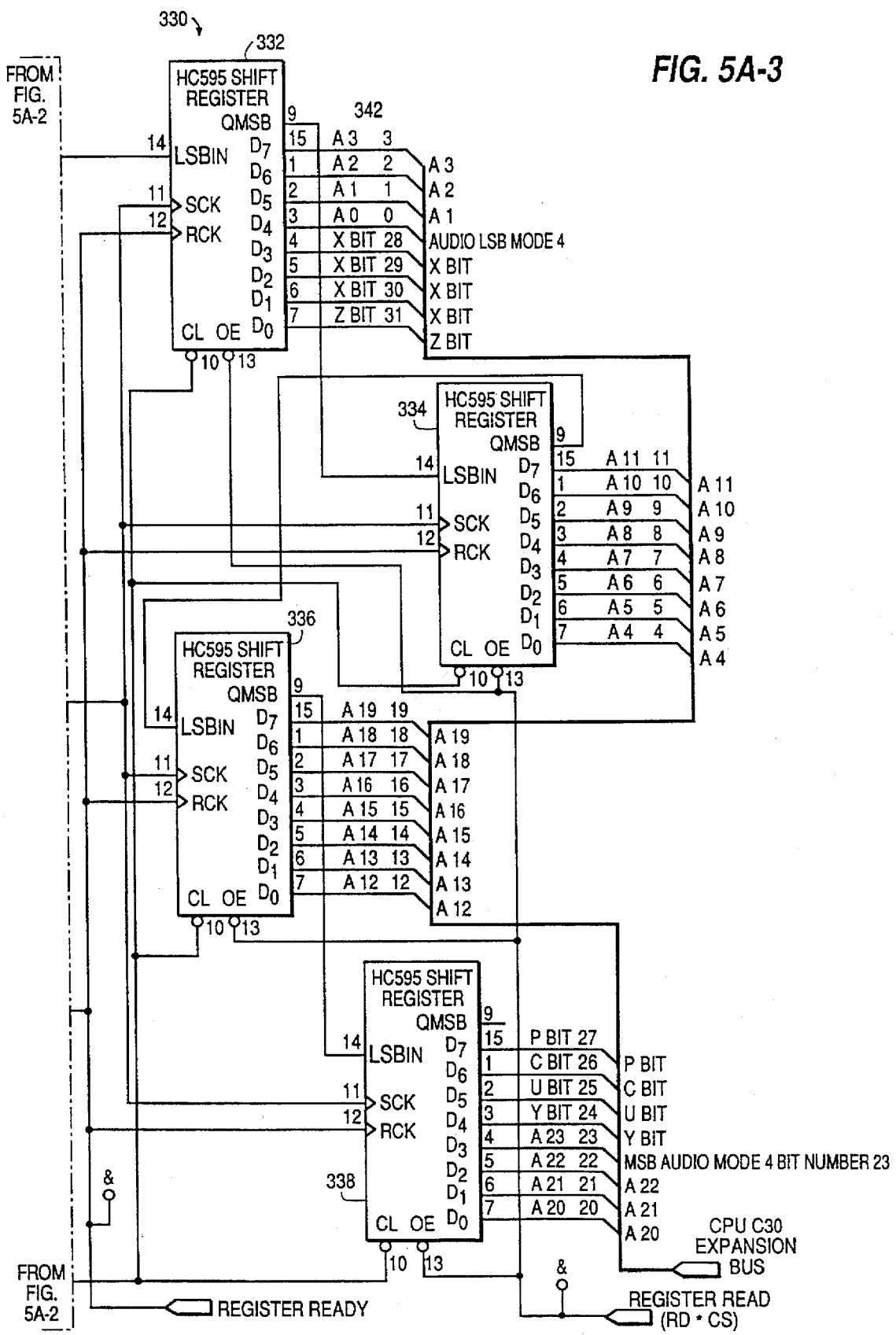
Figures 1, 5B:
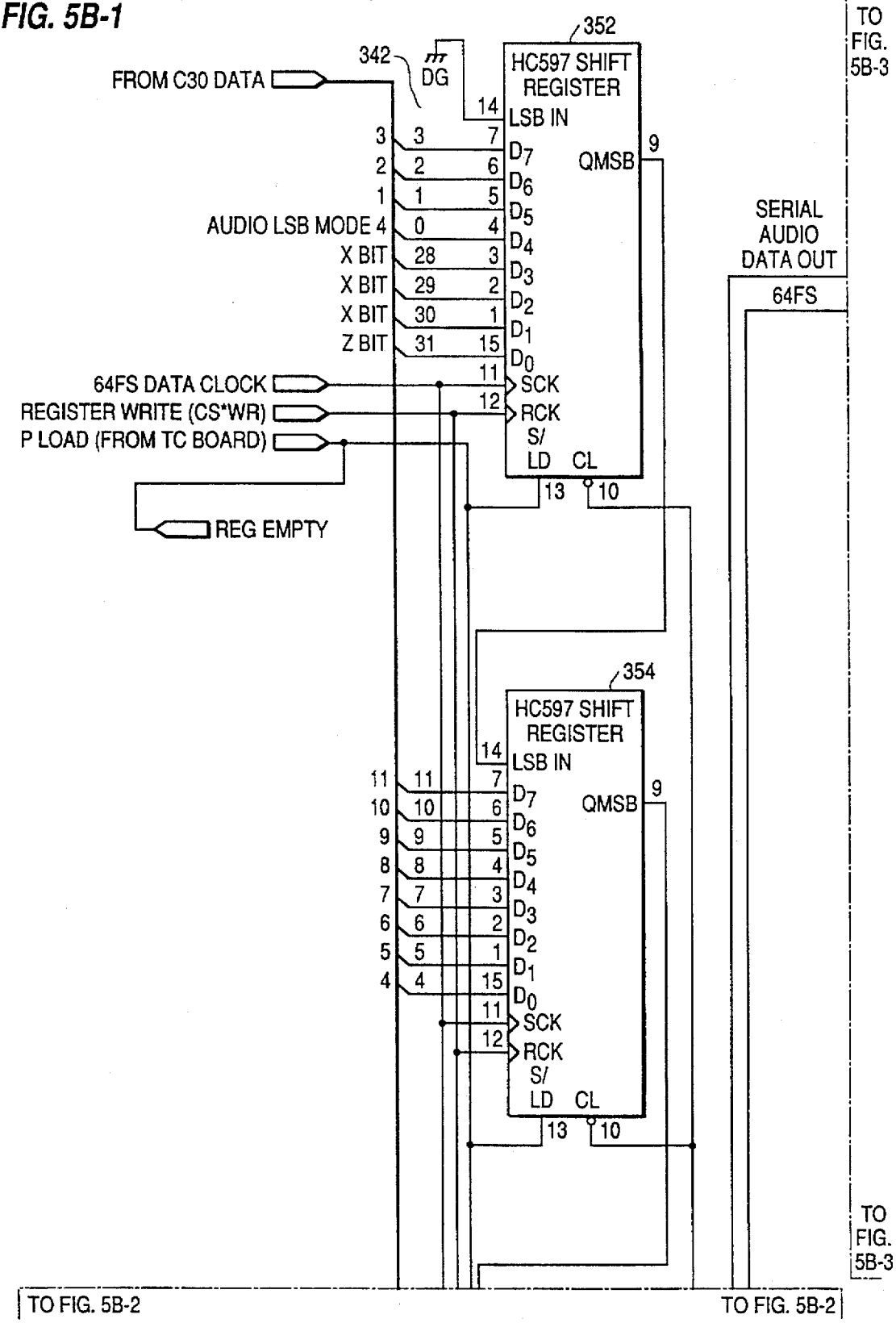
Figures 2, 5B:
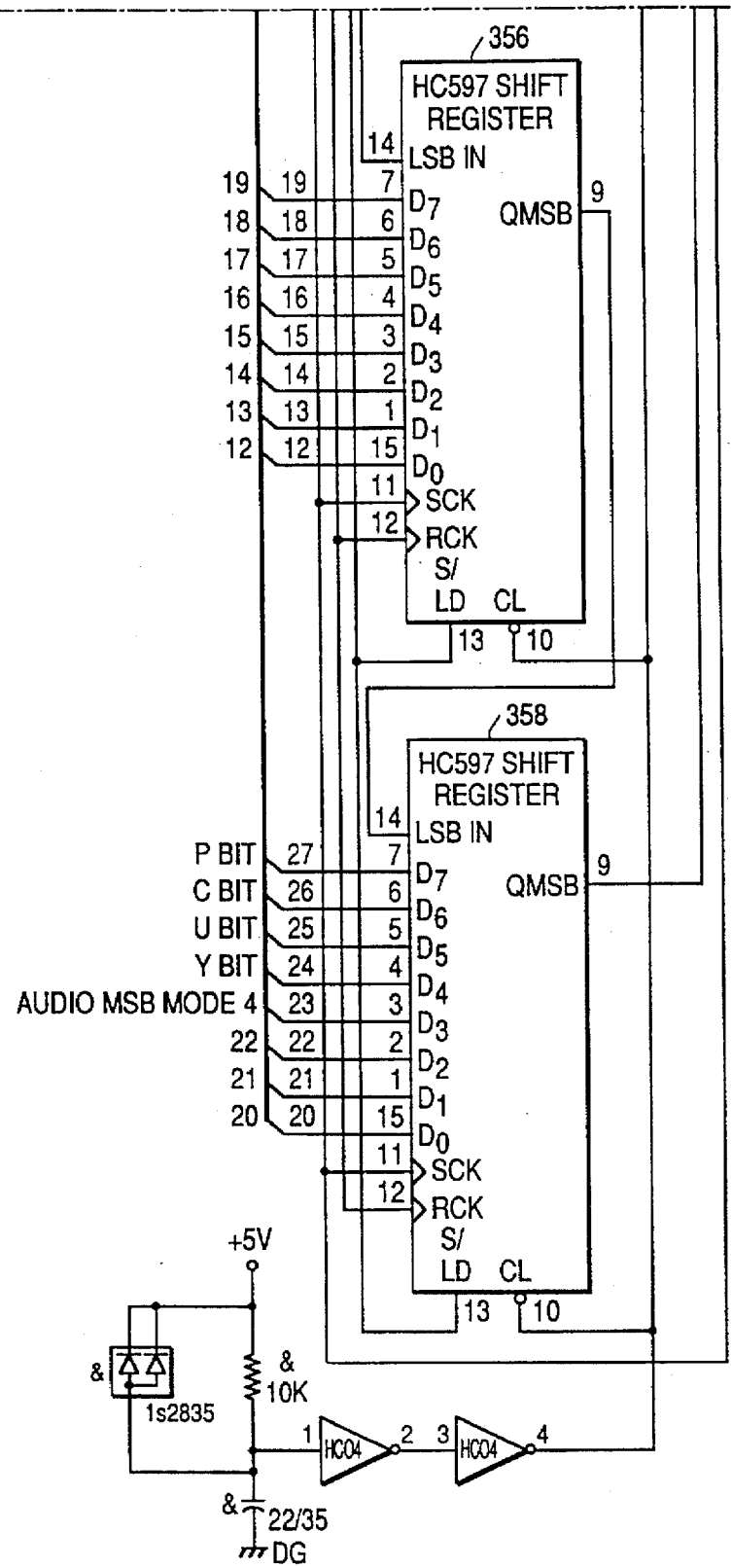
Figures 3, 5B:
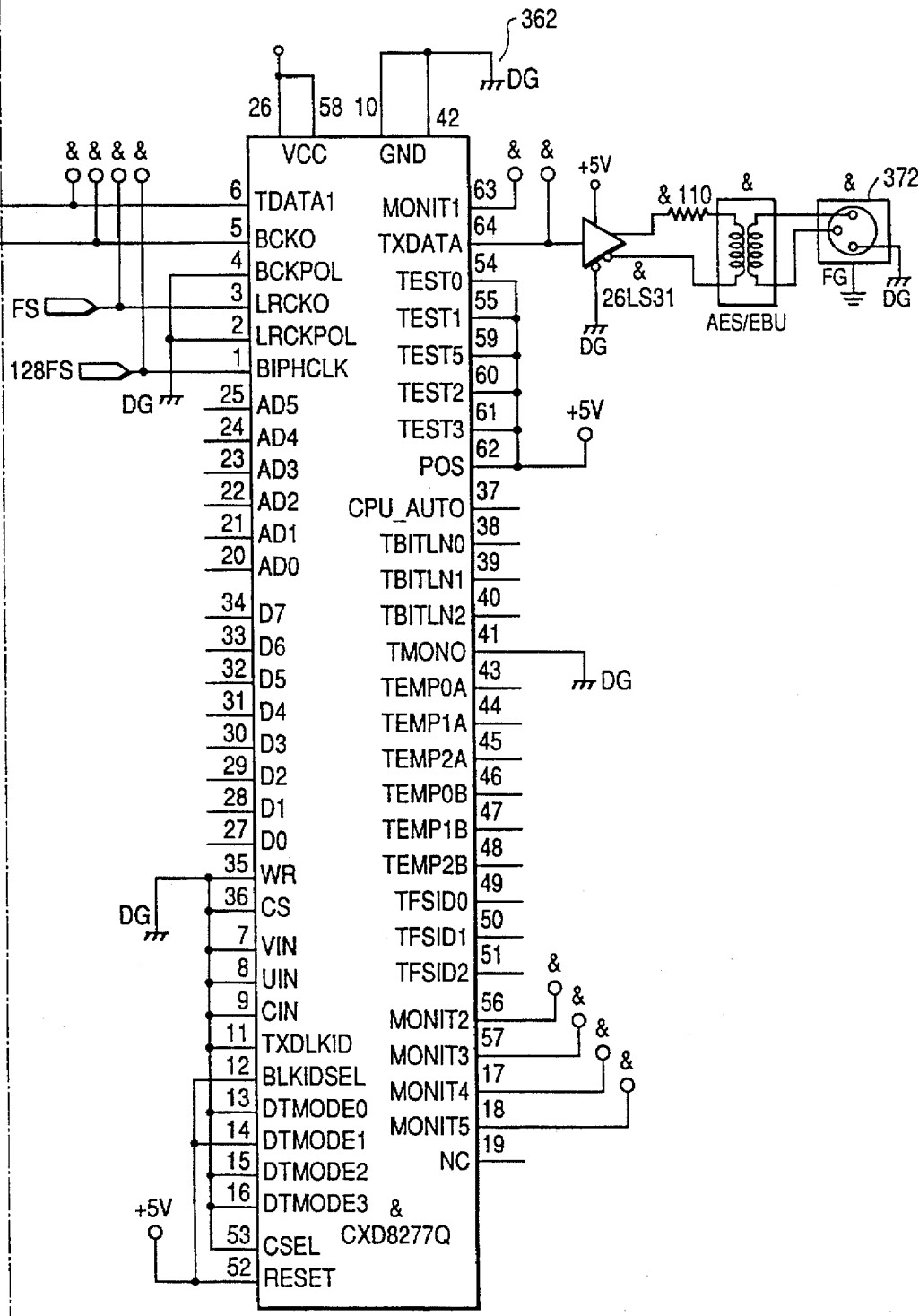

This example is illustrated in greater detail in the circuit diagram of FIGS. 5A and 5B in which common elements are indicated by the same reference numbers as in FIG. 4. In FIG. 5A, a three-pin connector 302 provides a serial input which is properly isolated from the recorder, by various isolation means 304. The serial data in AES/EBU format is transmitted to an integrated circuit 312 which indicates transmission errors and identifies subframes based on data bits contained in the serial input signal.

The audio data is then provided to four integrated circuits 332, 334, 336, and 338 which convert the serial data to parallel data. The parallel audio data is then provided to data bus lines 342. In the example shown, twenty four bits of audio data are provided by the S/A conversion circuits 332, 334, 336 and 338.

FIG. 5B shows circuitry for providing parallel audio data as a serial output. Accordingly, bus lines 342 are coupled to four integrated circuits 352, 354, 356, and 358 which are synchronized such that parallel data is converted to a serial signal. Serial data signals may then be encoded by use of an encoding integrated circuit 362. Once in AES/EBU format, serial signals are provided to a three-prong terminal 372 with which other devices may be operatively coupled.

According to these embodiments of the invention, eight channels may be read or recorded using a magneto optical disk. Thus, recorders incorporating the invention may be used to more conveniently edit various audio signals by utilizing the ease of access provided by a MO disk. The invention is thus well suited to incorporation in audio production and video post-production facilities. Its many applications in film television, radio and audio recording production include library storage and retrieval, composition of commercials by an assembly process, recording for acquisition of program material for use in an audio work station, and playback of work station generated program material.

The foregoing is a detailed description of the preferred embodiments. The scope of the invention, however, is not so limited. Various alternatives will be readily apparent to one of ordinary skill in the art. The invention is only limited by the claims appended hereto.

What is claimed is:

1. An apparatus for recording and playing back digital audio signals comprising:

input means for providing a plurality of channels of digital audio signals;

buffer means for storing digital data signals;

a direct memory access (DMA) controller for coupling the plurality of channels of digital audio signals to the buffer means;

a magneto optical disk drive; and a small computer system interface (SCSI) for operatively coupling the MO disk drive with the DMA controller;

wherein the plurality of channels of digital audio signals is stored by the buffer means and provided to the MO disk drive;

wherein the plurality of channels of audio data consists of eight channels of audio data.

2. The apparatus of claim 1 wherein the input means includes means for converting the plurality of channels of audio data from serial data to parallel data.

3. A method of recording and playing back digital audio signals comprising:

providing a plurality of channels of digital audio signals to a player/recorder apparatus;

coupling the plurality of channels of digital audio signals to a direct memory access (DMA) controller;

storing the plurality of channels of digital audio signals in one or more buffers under control of the DMA controller;

providing the digital audio data signals from the buffer or buffers to a magneto optical disk drive via a small computer system interface (SCSI); and recording the digital audio signals onto a magneto optical disk;

wherein the plurality of channels of audio data consists of eight channels of audio data.

4. The method of claim 3 wherein the step of providing a plurality of channels of digital audio signals to a player/ recorder apparatus includes converting the plurality of channels of audio data from serial data to parallel data.

5. An apparatus for recording and playing back digital audio signals comprising:

a small computer system interface (SCSI) for controlling a magneto optical disk drive; and input means for providing a plurality of channels of digital audio signals;

a direct memory access (DMA) controller for coupling the plurality of channels of digital audio signals to the SCSI whereby digital signals corresponding to the plurality of channels of digital audio signals are provided to the magneto optical disk drive;

wherein the plurality of channels of audio data consists of eight channels of audio data.

6. The apparatus of claim 5 further comprising buffer means for storing the digital data signals corresponding to the plurality of channels of digital audio signals.

7. The apparatus of claim 5 wherein the input means includes means for converting the plurality of channels of audio data from serial data to parallel data.

8. The apparatus of claim 1 further comprising means for providing time code data associated with said digital audio signals.

9. The apparatus of claim 1 further comprising a serial communications controller for coupling said apparatus to external devices.

10. The apparatus of claim 1 further comprising a central processing unit (CPU) cooperating with said DMA.

11. The apparatus of claim 10 wherein said CPU is programmed to provide a crossfade control function.

12. The apparatus of claim 5 further comprising means for providing time code data associated with said digital audio signals.

13. The apparatus of claim 5 further comprising a serial communications controller for coupling said apparatus to external devices.

14. The apparatus of claim 5 further comprising a central processing unit (CPU) cooperating with said DMA.

15. The apparatus of claim 14 wherein said CPU is programmed to provide a crossfade control function.

16. The method of claim 3 further comprising the step of providing time code data associated with said digital audio signals.

17. The method of claim 3 further comprising the step of providing said digital audio data signals to an external device through a serial communications controller.

18. The method of claim 3 further comprising providing a central processing unit (CPU) in cooperation with said DMA.

19. The apparatus of claim 18 further comprising crossfading said digital audio data signals using said CPU.

* * * * *